United States Patent [19]

Heinze et al.

[11] Patent Number: 5,575,439
[45] Date of Patent: Nov. 19, 1996

[54] FASTENING OF A THERMAL INSULATION STRUCTURE

[75] Inventors: Horst Heinze, Feldkirchen-Westerham; Axel Runge, Ottobrunn, both of Germany

[73] Assignee: Daimler-Benz Aerospace AG, Munich, Germany

[21] Appl. No.: 344,112

[22] Filed: Nov. 23, 1994

[30] Foreign Application Priority Data

Nov. 24, 1993 [DE] Germany .......................... 43 40 002.7

[51] Int. Cl.$^6$ ..................................................... B64C 1/06
[52] U.S. Cl. .................. 244/131; 244/158 A; 403/19; 403/397; 24/702; 24/589
[58] Field of Search ............................... 244/158 A, 121, 244/131; 24/702, 669, 573.1, 589; 403/19, 11, 393, 397, 384

[56] References Cited

U.S. PATENT DOCUMENTS

| | | | |
|---|---|---|---|
| 3,459,096 | 8/1969 | Parkin | 411/523 |
| 4,344,591 | 8/1982 | Jackson | 244/158 A |
| 4,439,968 | 4/1984 | Dunn | 244/158 A |
| 4,456,206 | 6/1984 | Tijssen | 244/131 |

FOREIGN PATENT DOCUMENTS

0214893A1  3/1987  European Pat. Off. .

*Primary Examiner*—Andres Kashnikow
*Assistant Examiner*—Tien Dinh
*Attorney, Agent, or Firm*—McGlew and Tuttle, P.C.

[57] ABSTRACT

Fastening of a thermal protection structure on the airframe of a craft such as a spaceplane, rocket, missile, re-entry capsule, or any hypersonic airplane wherein the thermal protection structure consists of a plurality of highly heat-resistant, mechanically stable panels, which may be provided with an additional gap seal if desired, with a plurality of fastening points per panel, which are arranged at spaced locations from one another and establish a positive-locking connection between the insulation structure and the airframe. The fastening has a first fastening point, which does not permit any movement, or it does permit an at least limited rotary movement of the panel around an axis extending at right angles to the airframe surface; a second fastening point, which permits a limited, linear displacement of the panel in parallel to the airframe surface; and at least one additional fastening point, which permits a limited displacement of the panel in all directions. The first fastening point is designed as a self-locking plug-type or snap connection, which can be released from the panel surface, with an assembling bolt, with a connection element accommodating it, and with a spring element interlocking these two parts. All other fastening points are designed as plug-type connections, with the same direction of plugging in for all fastening points.

14 Claims, 4 Drawing Sheets

FASTENING OF A THERMAL INSULATION STRUCTURE

BACKGROUND OF THE INVENTION

The present invention pertains to a fastening of a thermal insulation structure on the airframe of a spaceplane, rocket, missile, re-entry capsule, or any hypersonic airplane intended to reenter the atmosphere, wherein the insulation structure is formed of a plurality of highly heat-resistant, mechanically stable panels, which may be provided with an additional gap seal if desired, the plurality of fastening points per panel, which are arranged at spaced locations from one another and which establish a positive-locking connection between the insulation structure and the airframe.

FIELD OF THE INVENTION

Insulation structures, which consist of a plurality of highly heat-resistant panels to be connected to the airframe of a flying device, have been known from, e.g., the U.S. Space Shuttle Program. During reentry into the atmosphere, individual panels or even panel fields are damaged by thermal and flow mechanical effects so strongly that they must be replaced before the next launch. This replacement is very time-consuming and expensive due to the types of fastening used to date, e.g., gluing. Aside from the criterion of replaceability/reparability, it should be borne in mind that the fastening of the panels to the airframe must be extremely resistant and reliable in order to withstand the high flow mechanical loads occurring during certain phases of flight. On the other hand, it should allow thermal expansion and contraction of the panels, without generating undesired forces and stresses in the structure. Furthermore, the best possible protection of the fastening elements against high thermal loads is desirable.

A positive-locking plug-type fastening, which connects each panel to the next panel and to the airframe of the spaceplane, has been known from U.S. No. Pat. US-PS 4,344,591. To achieve this, each panel has, on its front side, two projecting tongues, which engage straps on the airframe as well as in recesses of the next panel. It is thus possible to prepare rows of panels in, e.g., the circumferential direction of the fuselage of the spaceplane, wherein the first and last panels require a separate fastening on one side. It is advantageous for the fastening elements, with the exception of an end fastening, to be located under the insulation in the thermally protected area. However, it is obvious that no individual panels, but only rows of panels or contiguous partial areas of rows of panels can be replaced here. Furthermore, a clearance-free fastening of the panels without hindering their longitudinal changes caused by thermal effects is practically impossible in this manner.

A thermal insulation structure for aircraft and spacecraft, which consists of flexible and twistable, heat-resistant plate strips attached at spaced locations to the surface of the airframe, as well as of insulation material arranged under it, which may be fastened to the airframe separately, if desired, has been known from EP-OS 0,214,893. This structure has the disadvantage that it cannot be used for extremely high temperature loads because of its thin, metallic surface. Furthermore, the fastening elements, i.e., the bolts, support structure, etc., extend into the hot surface area, which, though improving reparability, do affect the safety and reliability very adversely.

SUMMARY AND OBJECTS OF THE INVENTION

In light of the disadvantages of these prior-art solutions, the object of the present invention is to provide a positive-locking fastening for a thermal protection structure consisting of a plurality of highly heat-resistant, stable panels, which is especially secure and reliable and has a simple design, and which exerts only insignificant constraining forces on the panels at best and brings about an essentially clearance-free connection, and which is especially easy for assembly and repair, and in which even individual panels in the interconnected system can be replaced.

According to the invention, a fastener system is provided for fastening a thermal protection structure on an airframe of a spaceplane, particularly a spacecraft intended to reenter the atmosphere. The thermal protection structure is composed of a plurality of highly heat-resistant mechanically stable panels, having a hot gas-exposed panel surface and an airframe surface. The panels may be provided with an additional gap seal, if desired. A plurality of fastening points are provided per panel. These fastening points are arranged at spaced locations from one another and establish a positionlocking connection between the thermal protection structure and the airframe. The fastening includes a first fastening point (fixed bearing) which permits no movement or permits only a limited rotary movement of the panel around an axis that is at right angles or nearly at right angles to the airframe surface or to a local tangential plane of the airframe surface. A second fastening point is provided which permits a limited linear (diametric) displacement of the panel, in a direction parallel or substantially in parallel to the airframe surface. At least another fastening point is provided which permits a limited displacement of the panel in all directions which are parallel to or substantially parallel to the airframe surface.

The first fastening point is preferably designed as a self-locking plugtype or snap connection and can be released from the hot gas-exposed panel surface, with an assembling bolt, with a connection element (connection bridge) accommodating the assembling bolt and with a spring element (such as a leaf spring) which interlocks these two parts rigidly or in an at least limitly rotatable manner. The other fastening points are designed as plug-type connections, wherein the direction of plugging in is the same for all fastening points.

The present invention provides for a statically defined or statically only slightly overdefined connection between the panels and the airframe, which generates only negligible constraining forces at best, and fixes the panels in a defined position. The at least three fastening points per panel are provided for this purpose, wherein the first of these fastening points permits no movement of the panel or at least a limited rotary movement in its area, while the second fastening point permits a limited linear local displacement, and the third and each additional fastening point permits a limited local displacement of the panel in all directions. The cooperation of at least three attachment points leads to the desired, unique fixation of the position of each panel. The first fastening point is designed as a self-locking plug-type and snap connection, which can be released from the outside of the panel, and all other fastening points are designed as plug-type connections. The necessary thermal expansion gap between the panels (top side of the panel: max. 1,000° C./airframe wall: max. 200° C.) makes it possible to release the snap connection by means of a special tool and to remove the panel for inspection, repair and/or replacement. This gap is bridged over with an additional flexible gap filler during operation.

The first fastening point is provided with an assembling bolt which is rigidly connected to the airframe and has a recess with a connection bridge. The connection bridge is rigidly connected to the panel and has guide slots with a pilot chamfer for the recesses of the assembling bolt at a space location from the panel underside. A leaf spring which has multiple bends in its longitudinal direction and which has a hole for combinating the assembling bolt is further provided as well as a riveting bolt located at a space location from the hole. Two sections extending sloping in the shape of a ramp toward the hole from diametrically opposed sides, a free spring end extending into the gap area of the panel with a hole in the connection bridge for accommodating the riveting pin of the leaf spring can also provide as well as a fitting slot in a connection bridge for passing through the leaf spring and for securing it against twisting.

The second fastening bolt is designed with an assembling bolt which is rigidly connected to the airframe and has a recess and with a connection bridge which is rigidly connected to the panel and has a guide slot for the pilot chamfer for the recess of the assembling bolt at a space location from the panel underside. Each of the fastening point is designed with a connection catch which is rigidly connected to the airframe and with a connection bridge which is rigidly connected to the panel and has sliding surface contacting the connection catch. The thermal protection structure is composed of preferably rectangular and more particularly either square or rhombic panels. Four fastening points per panel may be provided within the arrangement of the first and second fastening points in the area of two diametrically opposed corners of the panel, the arrangement of the other two fastening points in the area of the remaining, diametrically opposed corners of the panel. The direction of plugging in of all four fastening points is preferable parallel or approximately parallel to the panel diagonal connecting with first and second fastening points.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS In the drawings.

DETAILED DESCRIPTION OF THE PREFERRED EMBODIMENTS

For better understanding of the Figures, it is noted that they show three corner areas of a square, flat panel 6. The flat panel 6 has four edge surfaces arranged obliquely in relation to the top side and the underside of the panel. Two adjoining edge surfaces enclose an obtuse angle with the panel underside 7 (see FIGS. 1, 2, 4 and 5), and the other two edge surfaces enclose acute angles with the panel underside 7 (see FIGS. 3, 4, and 5). Taking into account the flow conditions on the spaceplane (or space vehicle) to be thermally protected, the panels are directed, in principle, such that the joints or gaps located between the panel edge surfaces are overlapped in a shingle-like pattern by the cover layer projecting on both sides of each panel on the flow-swept hot gas side, and they open with one direction component in the direction of flow, i.e., obliquely in the direction of flow. Hot gases are thereby effectively prevented from penetration into the gaps.

It is clear to the person skilled in the art that, aside from the simple geometry shown, the panels may also be curved one-dimensionally or two-dimensionally and may have an extensively great variety of desired shapes; they may be, e.g., even honeycomb-like hexagons. However, this causes no changes in terms of the applicability of the present invention.

Figure 1:
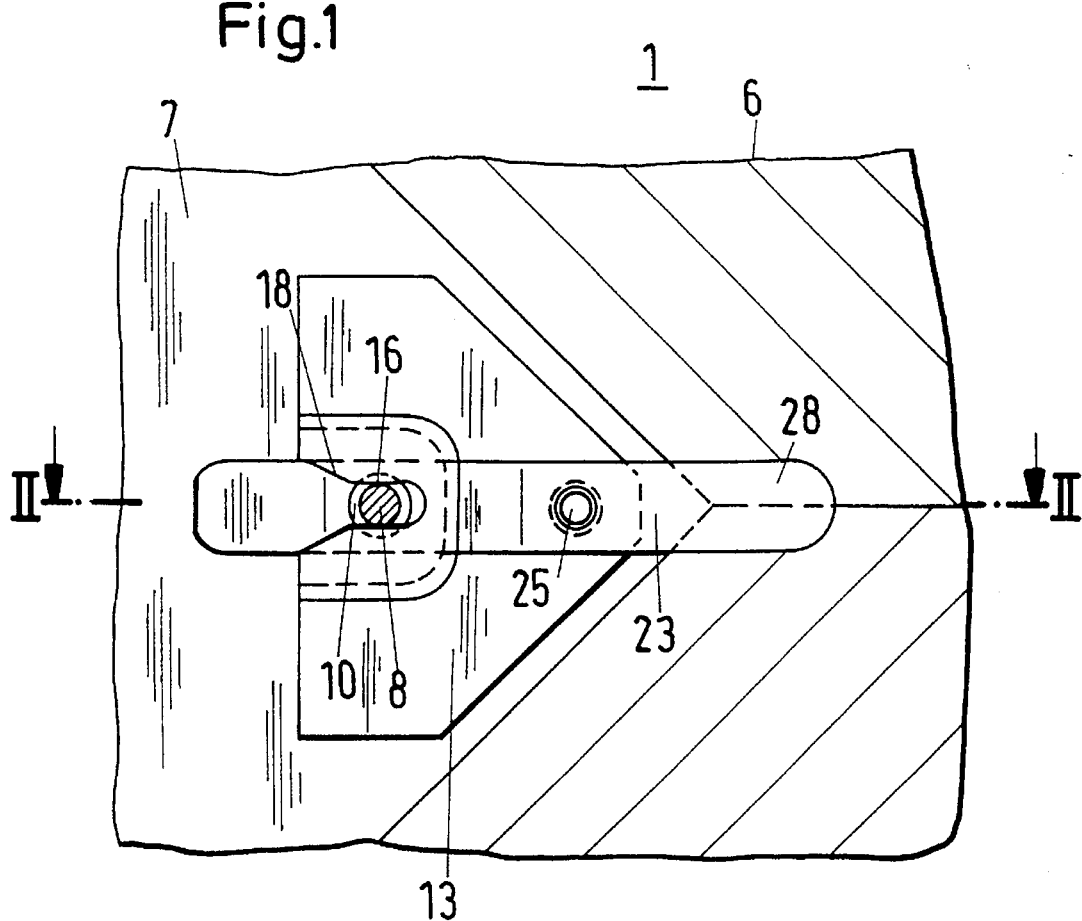
FIG. 1 is a view of a fastening point with releasable plug-type and snap connection, viewed from the side of the airframe.
Figure 2:
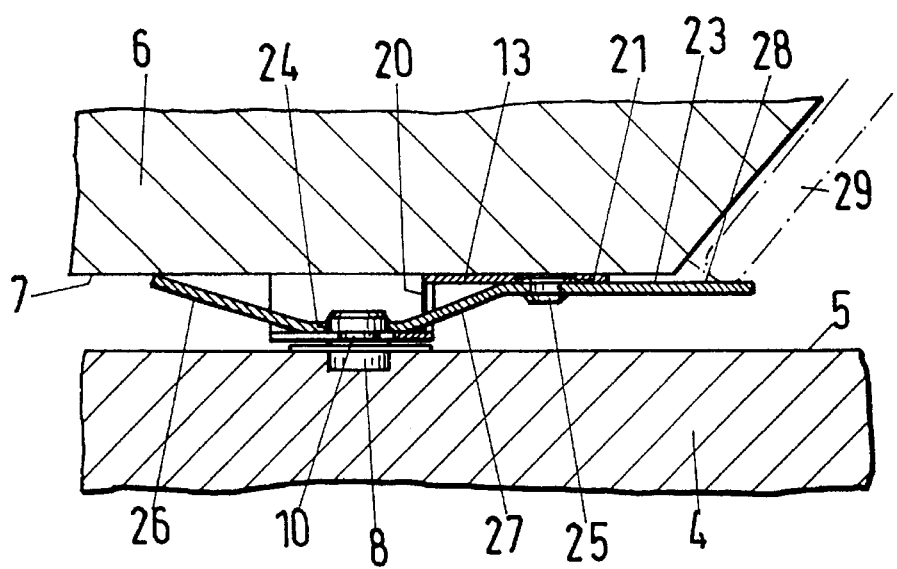
FIG. 2 is a partial sectional view according to line II—II in FIG. 1.

FIGS. 1 and 2 show the fastening point 1, which forms the fixed point of the entire arrangement, and via which the panel 6 can be locked or released. A connection bridge 13 is fastened, e.g., by soldering, on the panel underside 7 for this purpose. The connection bridge 13 has a guide slot 16, which is open on one side, with a pilot chamfer 18. As a counterpart for this, an assembling bolt 8, whose recess 10 fits into the guide slot 16 extensively without clearance, is provided on the side of the airframe 4. The releasable locking is performed by the leaf spring 23, which surrounds the assembling bolt 8 in its hole 24 in a positive-locking member and which is fixed in the hole 21 of the connecting bridge 13 via the riveting bolt 25 rigidly connected to it. Thus, only the rotatability of the assembling bolt 8 in the hole 24 and in the guide slot 16 remains as the kinematic degree of freedom. The free spring end 28 extends into the area of the gap at the corner of the panel (the adjacent panel is not shown), and it can be pressed down toward the airframe 4 by means of a tool 29 of matching shape for release. The overlapping corner of the cover layer 30 (see FIG. 7) is bent up beforehand in order to ensure accessibility to the spring end 28 for the tool 29. As a result, the riveting bolt 25 is disengaged, and the connection bridge 13 with the panel 6 can be displaced until the guide slot 16 is freed from the assembling bolt 8. The panel 6 can then be removed from the assembly of panels in the upward direction. Conversely, the panel is mounted with the leaf spring 23 already snapped into the connection bridge 13. While the guide slot 16 of the connection bridge 13 is pushed over the recess 10 of the assembling bolt 8, the bolt head elastically pushes the ramp-like section 26 of the leaf spring 23 in the upward direction, until the assembling bolt 8 becomes aligned with the hole 24, and the leaf spring 23 snaps down into the position according to FIG. 2. The section 27 of the leaf spring 23 is accurately guided during these processes in a fitting slot 20 of the connection bridge 13, so that no unintended twisting of the leaf spring 23 around the axis of the riveting bolt 25 is possible. To remove an already damaged panel, it is irrelevant whether the panel corner in question is bent up or intentionally separated, but without damaging the fastening point itself.

Figure 3:
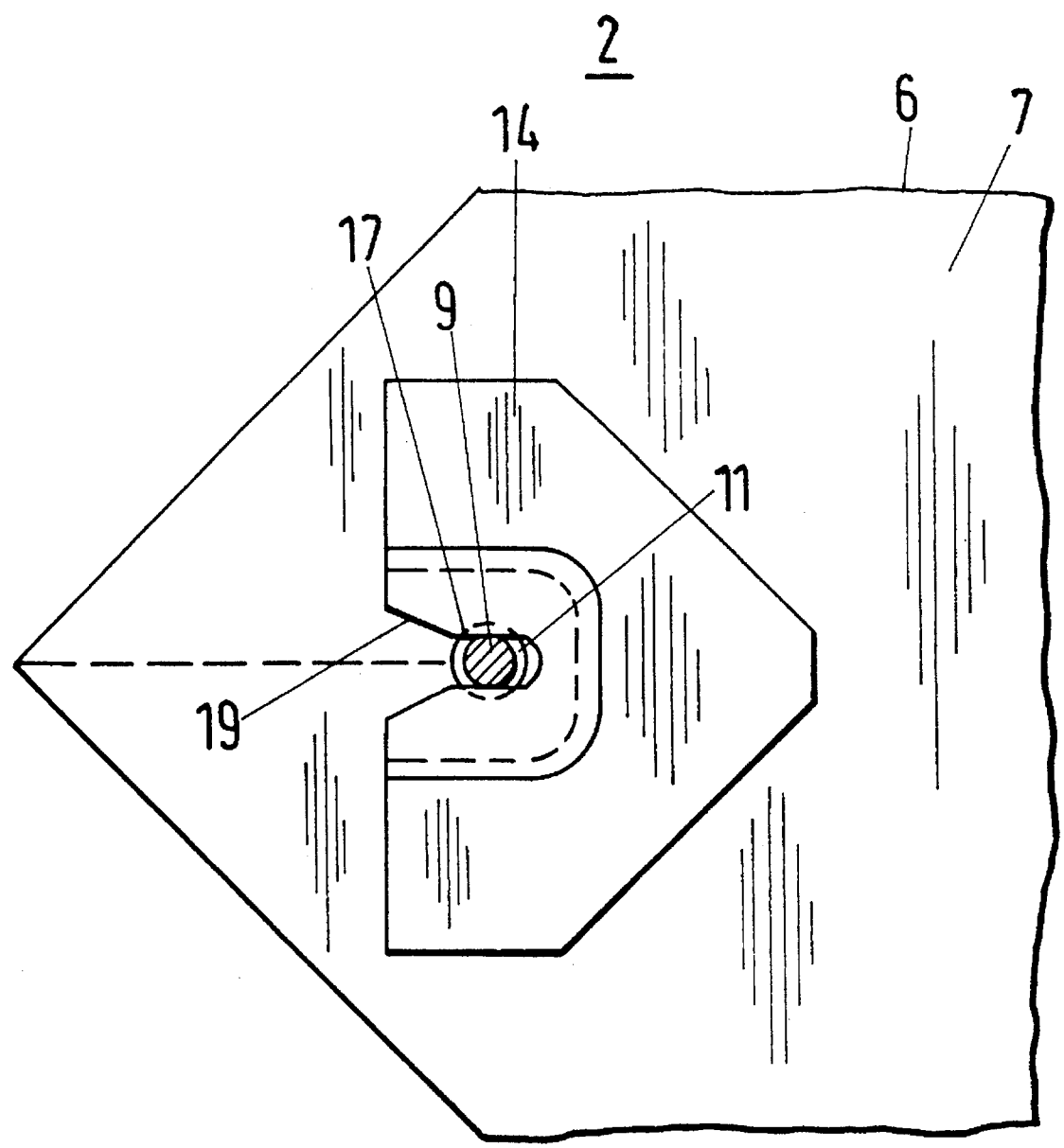
FIG. 3 is a view of a fastening point with a plug-type connection capable to perform a limited linear movement from the side of the airframe.

FIG. 3 shows the fastening point 2 at the corner of the panel 6 diametrically opposed to the fastening point 1. The design differs from the first-described design essentially only in that the leaf spring acting as a locking element is missing. The connection bridge 14 also has a guide slot 17 with a pilot chamfer 19 for the recess 11 of the assembling bolt 9. Due to the absence of locking, a limited linear displacement in the longitudinal direction of the guide slot is possible, in addition to the rotation about the assembling bolt 8. Constraining forces due to different changes in the lengths of the panel 6 and of the airframe 4 are thus avoided.

If the connecting panel diagonal is considered mechanically to be a beam mounted in a statically defined manner, the fastening point 1 forms the fixed support, and the fastening point 2 is the loose support of the beam.

Figure 4:
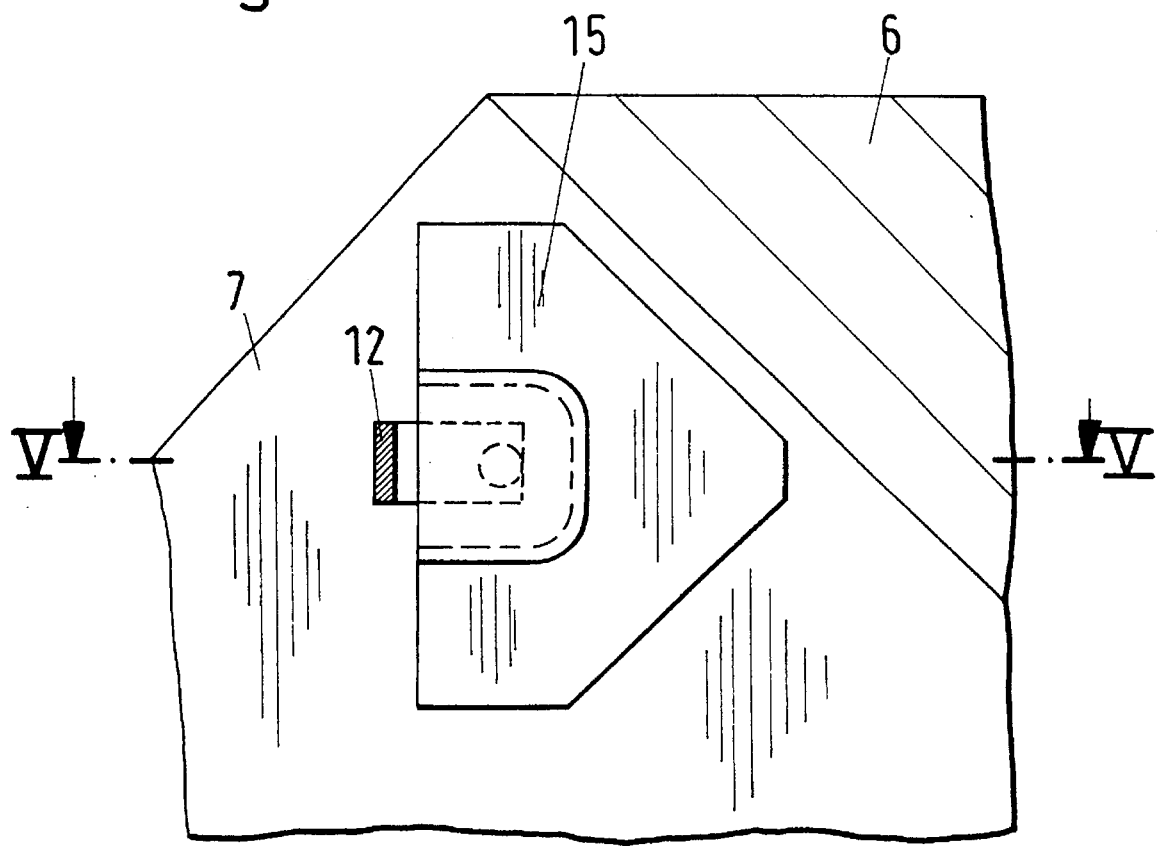
FIG. 4 is a view of a fastening point with a plug-type connection capable to perform limited movements in all directions front the side of the airframe.
Figure 5:
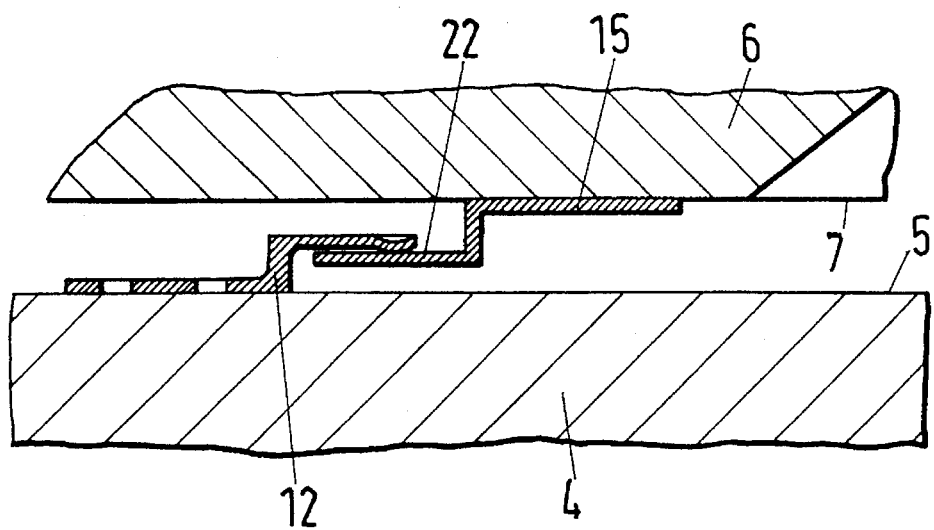
FIG. 5 is a partial section along line V—V in FIG. 4.

FIGS. 4 and 5 show another fastening point 3, which is present in either of the two remaining panel corners. Each fastening point 3 comprises, on the panel side, a connection bridge 15 with a sliding surface 22 located at a spaced location from the panel 6, and, on the airframe side, a connection catch 12, which is in contact with the sliding surface 22 and whose contact surface preferably has a crowned design. Thus, each fastening point 3 limits only a linear movement of the panel 6 at right angles away from the airframe surface. All other linear and rotary movements of the panel 6 are not hindered. In other words, each fastening point 3 prevents a tilting movement of the panel 6 around the axis connecting the fastening points 1 and 2 in one direction.

It is also possible to replace the two fastening points 3 by a single one by designing it as a double-acting fastening point, so that it prevents the distance between the panel and the airframe from both decreasing and increasing. This fastening point should also be located at a sufficient distance from the axis connecting the fastening points 1 and 2.

Figure 6:
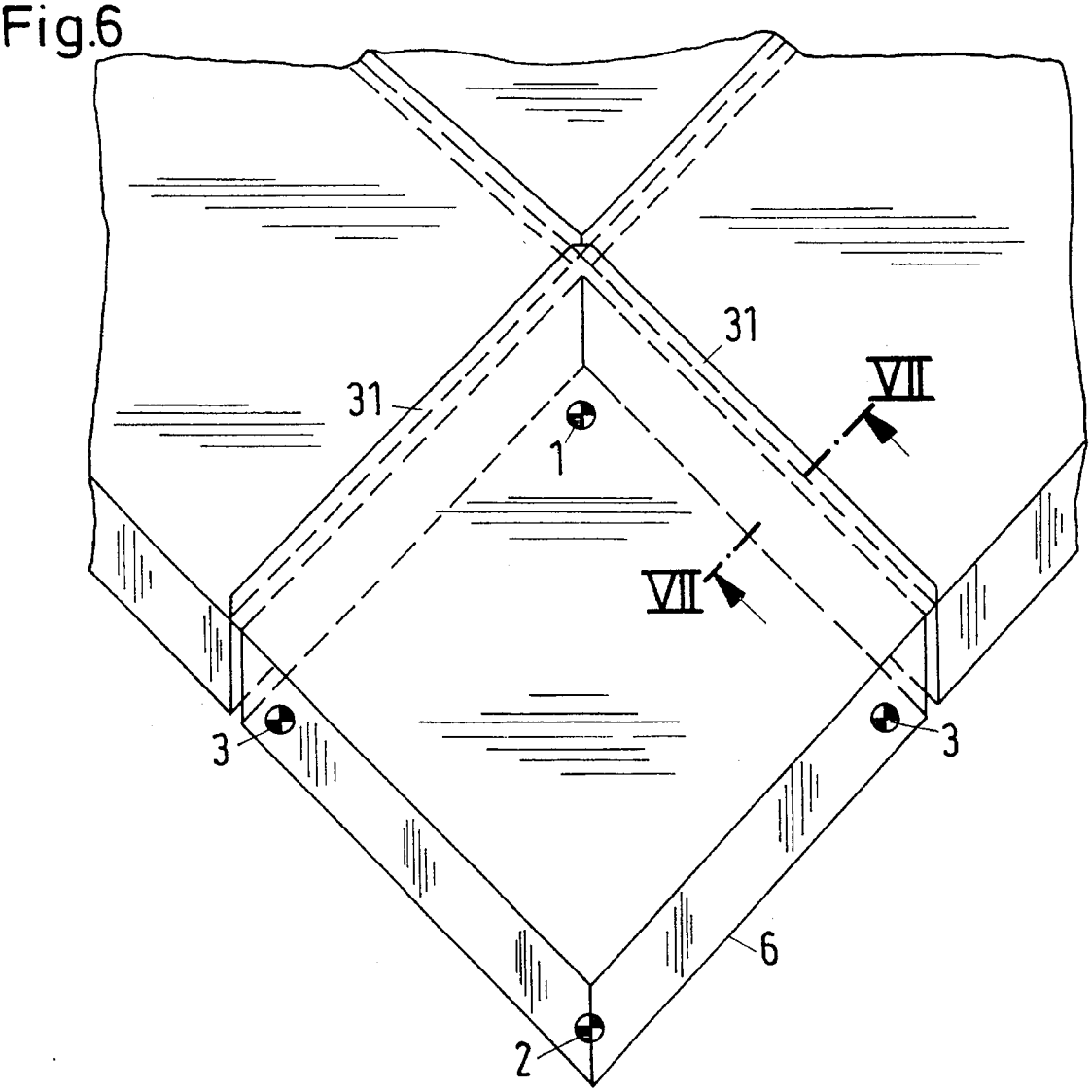
FIG. 6 is a partial view of the outer surface of a panel interconnected system exposed to flow.
Figure 7:
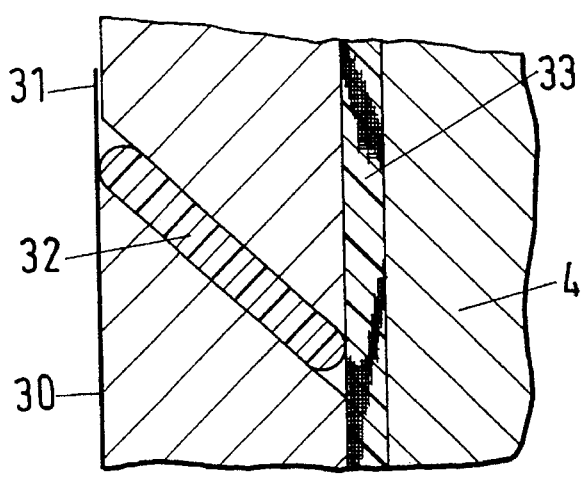
FIG. 7 is a partial view according to line VII—VII in FIG. 6 on an enlarged scale and rotated by 450°.

FIGS. 6 and 7 illustrate the principle of the interconnected system of panels and of the gap sealing.

FIG. 6 shows a (non-perspective) vertical top view of the flow-exposed outer surface of the panel system, wherein four edge surfaces of three panels, whose edge surfaces are sloped obliquely to the direction of view, are visible, i.e., without the other panels joining in the downward direction.

The position of the four fastening points located under the panel 6 is indicated by partially filled circles and with the reference numerals 1, 2, 3, 3. It can be recognized that the cover layer 30 of each panel 6 projects over the respective oblique edge surface at the top to the left and right, so that a shingle-like overlapping over the expansion gaps is obtained. As a result, a closed, extensively smooth flow surface is obtained. A dash-dotted horizontal line is shown above the fastening point 1. To release the panel, the corner of the cover layer 30 located above this line is bent up for inserting the tool into the gap and to release the fastening.

FIG. 7 shows that an elastic gap seal 32 is arranged as an additional flow barrier in the gap under the overlap 31. An elastic felt 33, which exerts a defined supporting force on the panel from below and acts as a vibration damper in conjunction with the fastening points, is placed between the airframe 4 and the panels.

While a specific embodiment of the invention has been shown and described in detail to illustrate the application of the principles of the invention, it will be understood that the invention may be embodied otherwise without departing from such principles.

What is claimed is:

1. A fastening system of a thermal insulation structure on the airframe of craft for protection during reentry into the atmosphere, comprising an airframe having an air frame surface, an insulation structure including a plurality of highly heat-resistant, mechanically stable panels, each of said panels having a hot gas-exposed panel surface and an airframe connection panel surface, a plurality of fastening points being provided on each of said panels, said fastening points being arranged at spaced locations from one another and including fastening means at each of said fastening points for establishing a positive-locking connection between the insulation structure and the airframe, said fastening means including:

first fastening point means for either preventing movement of the panel, permitting limited rotary movement of said panel around an axis that is substantially at right angles to said airframe surface, or permitting limited movement of the panel in a local tangential plane of the airframe surface at the first fastening point, said first fastening point means being formed as a self-locking plug-type or snap connection which is releasable from said hot gas-exposed panel surface, with an assembling bolt, a connection element accommodating said assembling bolt and a spring element interlocking said assembling bolt and said connection element rigidly or in a limitedly rotatable manner;

second fastening point means for permitting a limited linear displacement of said panel in parallel or approximately in parallel to the airframe surface; and another fastening point means for permitting a limited displacement of said panel in all directions in parallel or approximately in parallel to the airframe surface, said second fastening point means and said another fastening point means each being plug-type connections, wherein the direction of plugging in is the same for all fastening points.

2. Fastening system in accordance with claim 1, wherein said first fastening point means assembling bolt is rigidly connected to said airframe and has a recess, said connection element being formed as a connection bridge rigidly connected to said panel, said connection bridge having a guide slot with a pilot chamfer for receiving said recess of said assembling bolt at a spaced location from said panel airframe connection surface, said spring element being provided as a leaf spring with multiple bends in a longitudinal direction, and with a hole for accommodating the assembling bolt, a riveting bolt located at a spaced location from said hole, two sections extending sloping in a shape of a ramp toward said hole from diametrically opposed sides, and a free spring end extending into a gap area of the panel, said connection bridge having a connection bridge hole for accommodating said riveting bolt of said leaf spring, and with a fitting slot in said connection bridge for passing through said leaf spring and to secure it against twisting.

3. Fastening system in accordance with claim 1, wherein said second fastening point means includes a second fastening point assembling bolt, rigidly connected to the airframe, said second fastening point assembling bolt having a recess, a connection bridge, rigidly connected to the panel with a guide slot having a pilot chamfer for receiving said recess of said second fastening point assembling bolt, at a spaced location from the airframe connection panel surface; and said another fastening point including a connection catch, rigidly connected to the airframe, and an another connection point connection bridge, rigidly connected to the panel and having a sliding surface contacting the connection catch.

4. Fastening system in accordance with claim 2, wherein said second fastening point means includes a second fastening point assembling bolt, rigidly connected to the airframe, said second fastening point assembling bolt having a recess, a connection bridge, rigidly connected to the panel with a guide slot having a pilot chamfer for receiving said recess of said second fastening point assembling bolt, at a spaced location from the airframe connection panel surface; and said another fastening point including a connection catch, rigidly connected to the airframe, and an another connection point connection bridge, rigidly connected to the panel and having a sliding surface contacting the connection catch.

5. Fastening system in accordance with claim 1 wherein said panels are rectangular and are attached to said airframe at four fastening points per panel with said first and second fastening points in an area of two diametrically opposed corners of the panel and with the other two fastening points in the area of the remaining, diametrically opposed corners of the panel.

6. Fastening system in accordance with claim 5 wherein said panels are one of square and rhombic shape.

7. Fastening system in accordance with claim 2 wherein said panels are rectangular and are attached to said airframe at four fastening points per panel with said first and second fastening points in an area of two diametrically opposed corners of the panel and with the other two fastening points in the area of the remaining, diametrically opposed corners of the panel.

8. Fastening system in accordance with claim 7 wherein said panels are one of square and rhombic shape.

9. Fastening system in accordance with claim 5 wherein a direction of plugging in of all four fastening points is parallel or approximately parallel to the panel diagonal connecting the first and second fastening points.

10. Fastening system in accordance with claim 7 wherein a direction of plugging in of all four fastening points is parallel or approximately parallel to the panel diagonal connecting the first and second fastening points.

11. A fastening system of a thermal insulation structure on the airframe of craft for protection during reentry into the atmosphere, comprising an airframe having an air frame surface, an insulation structure including a plurality of highly heat-resistant, mechanically stable panels, each of said panels having a hot gas-exposed panel surface and an airframe connection surface, a plurality of fastening points being provided on each of said panels, said fastening points being arranged at spaced locations from one another and including fastening means at each of said fastening points for establishing a positive-locking connection between the insulation structure and the airframe, said fastening means including:

first fastening point means for either preventing movement of the panel, permitting limited rotary movement of said panel around an axis that is substantially at right angles to said airframe surface, or permitting limited movement of the panel in a local tangential plane of the airframe surface at the first fastening point;

said first fastening point means is formed as a self-locking plug-type or snap connection that can be released from said hot gas-exposed panel surface, with an assembling bolt, a connection element accommodating said assembling bolt and a spring element interlocking said assembling bolt and said connection element rigidly or in a limitedly rotatable manner;

second fastening point means for permitting a limited linear displacement of said panel in parallel or approximately in parallel to the airframe surface; and another fastening point means for permitting a limited displacement of said panel in all directions in parallel or approximately in parallel to the airframe surface.

12. Fastening system in accordance with claim 11 wherein said second fastening point means and said another fastening point means each being plug-type connections, wherein the direction of plugging in is the same for all fastening points.

13. Fastening system in accordance with claim 11, wherein said first fastening point means assembling bolt is rigidly connected to said airframe and has a recess, said connection element being formed as a connection bridge rigidly connected to said panel, said connection bridge having a guide slot with a pilot chamfer for receiving said recess of said assembling bolt at a spaced location from said panel airframe connection surface, said spring element being provided as a leaf spring with multiple bends in a longitudinal direction, and with a hole for accommodating the assembling bolt, a riveting bolt located at a spaced location from said hole, two sections extending sloping in a shape of a ramp toward said hole from diametrically opposed sides, and a free spring end extending into a gap area of the panel, said connection bridge having a connection bridge hole for accommodating said riveting bolt of saidleaf spring, and with a fitting slot in said connection bridge for passing through said leaf spring and to secure it against twisting.

14. Fastening system in accordance with claim 12, wherein said second fastening point means includes a second fastening point assembling bolt, rigidly connected to the airframe, said second fastening point assembling bolt having a recess, a connection bridge, rigidly connected to said panel with a guide slot having a pilot chamfer for receiving said recess of said second fastening point assembling bolt at a spaced location frown the airframe connection panel surface; and said another fastening point including a connection catch, rigidly connected to the airframe, and an another connection point connection bridge, rigidly connected to said panel and having a sliding surface contacting said connection catch.

* * * * *